(12) United States Patent
Wang et al.

(10) Patent No.: US 12,289,658 B2
(45) Date of Patent: Apr. 29, 2025

(54) METHOD FOR BUFFER STATUS REPORTING, AND TERMINAL

(71) Applicant: DATANG MOBILE COMMUNICATIONS EQUIPMENT CO., LTD., Beijing (CN)

(72) Inventors: Da Wang, Beijing (CN); Yali Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 517 days.

(21) Appl. No.: 17/762,359

(22) PCT Filed: Jun. 11, 2020

(86) PCT No.: PCT/CN2020/095658
§ 371 (c)(1),
(2) Date: Mar. 21, 2022

(87) PCT Pub. No.: WO2021/057100
PCT Pub. Date: Apr. 1, 2021

(65) Prior Publication Data
US 2022/0394543 A1    Dec. 8, 2022

(30) Foreign Application Priority Data

Sep. 25, 2019   (CN) .......................... 201910910220.0

(51) Int. Cl.
*H04W 28/02*    (2009.01)
*H04W 4/40*     (2018.01)
*H04W 72/56*    (2023.01)

(52) U.S. Cl.
CPC ......... *H04W 4/40* (2018.02); *H04W 28/0278* (2013.01); *H04W 72/56* (2023.01)

(58) Field of Classification Search
CPC .......................... H04W 28/0278; H04W 72/56
See application file for complete search history.

(56) References Cited

U.S. PATENT DOCUMENTS

2017/0245245 A1    8/2017   Kim et al.
2018/0103460 A1*   4/2018   Sharma ................. H04W 76/27
(Continued)

FOREIGN PATENT DOCUMENTS

CN    109891987 A    6/2019
CN    110139388 A    8/2019

OTHER PUBLICATIONS

Ericsson,"gNB-Scheduled Resource Allocation for Sidelink", 3GPP TSG-RAN WG2 #106, Reno, USA, May 13-17, 2019, total 4 pages, R2-1907354.
(Continued)

*Primary Examiner* — Ajay Cattungal
(74) *Attorney, Agent, or Firm* — Kilpatrick Townsend & Stockton LLP (57) ABSTRACT

Disclosed are a method for a Buffer Status reporting (BSR), and a terminal, and when both a BSR of a sidelink interface and a BSR of a Uu interface need to be sent by a terminal, the sending of the BSR of the sidelink interface and the BSR of the Uu interface can be dynamically determined, thus ensuring the quality of service of services at the Uu interface and a sidelink interface. The method includes a terminal determining a priority order of logical channels on which a Uu interface and a sidelink interface trigger the sending of a Buffer Status reporting (BSR); and the terminal sending the BSR according to the priority order of the logical channels on which the Uu interface and the sidelink interface trigger the sending of the BSR.

13 Claims, 5 Drawing Sheets

(56) References Cited

U.S. PATENT DOCUMENTS

| | | | | |
|---|---|---|---|---|
| 2018/0317123 A1* | 11/2018 | Chen | .................... | H04W 72/21 |
| 2019/0124015 A1* | 4/2019 | Loehr | ............... | H04W 28/0284 |
| 2019/0182639 A1* | 6/2019 | Basu Mallick | ....... | H04W 72/23 |
| 2021/0153065 A1* | 5/2021 | Adjakple | .......... | H04W 28/0268 |
| 2021/0274545 A1* | 9/2021 | Adjakple | .............. | H04W 72/21 |
| 2021/0298040 A1* | 9/2021 | Zhao | .................... | H04W 76/14 |
| 2021/0392542 A1* | 12/2021 | Chen | .................... | H04W 72/21 |

OTHER PUBLICATIONS

Huawei et al.,"Discussion on SL BSR procedure for NR SL Mode-1", 3GPP TSG-RAN WG2 Meeting #106, Reno, USA, May 13-17, 2019, total 8 pages, R2-1907449.

Ericsson, "Discussion on SL Mode 1 left issues", 3GPP TSG-RAN WG2 #107bis, Chongqing, China, Oct. 14-18, 2019, total 6 pages, R2-1913325.

* cited by examiner

METHOD FOR BUFFER STATUS REPORTING, AND TERMINAL

CROSS-REFERENCE OF RELATED APPLICATIONS

The present application is a National Stage of International Application No. PCT/CN2020/095658, filed Jun. 11, 2020, which claims the priority from Chinese Patent Application No. 201910910220.0, filed with the China National Intellectual Property Administration on Sep. 25, 2019 and entitled "Method and Terminal for Buffer Status reporting", which is hereby incorporated by reference in its entirety.

FIELD

The present application relates to the field of wireless communication technologies, and in particular to a method and terminal for Buffer Status reporting.

BACKGROUND

The vehicle to everything (V2X) technology can perceive the surrounding conditions of vehicles in real time, share the road information and provide timely warnings via wireless communications between vehicles, between vehicles and road test infrastructure, and between vehicles and passersby.

In the existing Long Term Evolution (LTE) V2X technology (that is, Rel-14 LTE V2X technology), the broadcast communication of the PC5 interface (also called sidelink, which is described as Sidelink in protocol) that transmits data between User Equipments (UEs) can already support the transmission of basic services based on road safety.

With the further development of Internet of Vehicles technology, some new application scenarios appear in the New Radio (NR) V2X current phase compared to the LTE V2X, such as: vehicle formation, advanced driving, sensor information sharing, remote control and other applications. It can be seen that there are many delay-sensitive services in the NR V2X, and the delay requirements thereof are relatively high. When a terminal UE reports the buffer status, it is hoped that the Sidelink resources allocated by the base station can be obtained faster, to better ensure the Quality of Service (QoS) of the Sidelink interface services. But the Uu interface (the link from the UE to the base station) also has delay-sensitive services and also needs to apply for resources from the base station as soon as possible. Therefore, when the terminal needs to send the Buffer Status reporting (BSR) of the Sidelink and the BSR of the Uu interface simultaneously, the terminal will always send the BSR of the Uu interface preferentially if the resources allocated by the base station are not enough, to affect the transmission delay of sidelink services.

SUMMARY

The present application provides a method and terminal for Buffer Status reporting, which can dynamically determine the sending of the BSR of the sidelink interface and the BSR of the Uu interface when the terminal needs to send the BSR of the sidelink interface and the BSR of the Uu interface simultaneously, and ensure the quality of service of the Uu interface and Sidelink interface services.

In one embodiment of the present application provide a method for Buffer Status reporting, including:

determining, by a terminal, a priority order of logical channels of a Uu interface and a sidelink interface which triggering BSRs; and sending, by the terminal, the BSRs according to the priority order of the logical channels of the Uu interface and the sidelink interface which triggering the BSRs.

In some embodiments, the determining, by the terminal, the priority order of the logical channels of the Uu interface and the sidelink interface which triggering the BSRs, includes:

comparing, by the terminal, a priority parameter of a logical channel of the Uu interface which triggering BSR with a first priority threshold, and/or comparing, by the terminal, a priority parameter of a logical channel of the sidelink interface which triggering BSR with a second priority threshold; and determining, by the terminal, the priority order of the logical channels of the Uu interface and the sidelink interface which triggering the BSRs according to a result of the comparing.

In some embodiments, the determining, by the terminal, the priority order of the logical channels of the Uu interface and the sidelink interface which triggering the BSRs according to the result of the comparing, includes:

determining that a priority of the logical channel of the Uu interface which triggering BSR is higher than a priority of the logical channel of the sidelink interface which triggering BSR, when the priority parameter of the logical channel of the Uu interface which triggering BSR is lower than the first priority threshold; or determining that a priority of the logical channel of the sidelink interface which triggering BSR is higher than a priority of the logical channel of the Uu interface which triggering BSR, when the priority parameter of the logical channel of the Uu interface which triggering BSR is not lower than the first priority threshold and the priority parameter of the logical channel of the sidelink interface which triggering BSR is lower than the second priority threshold; or determining that a priority of the logical channel of the Uu interface which triggering BSR is higher than a priority of the logical channel of the sidelink interface which triggering BSR, when the priority parameter of the logical channel of the Uu interface which triggering BSR is not lower than the first priority threshold and the priority parameter of the logical channel of the sidelink interface which triggering BSR is not lower than the second priority threshold.

In some embodiments, the determining, by the terminal, the priority order of the logical channels of the Uu interface and the sidelink interface which triggering the BSRs according to the result of the comparing, includes:

determining that a priority of the logical channel of the sidelink interface which triggering BSR is higher than a priority of the logical channel of the Uu interface which triggering BSR, when the priority parameter of the logical channel of the sidelink interface which triggering BSR is lower than the second priority threshold; or determining that a priority of the logical channel of the Uu interface which triggering BSR is higher than a priority of the logical channel of the sidelink interface which triggering BSR, when the priority parameter of the sidelink interface which triggering BSR is not lower than the second priority threshold and the priority parameter of the logical channel of the Uu interface which triggering BSR is lower than the first priority threshold; or determining that a priority of the logical channel of the sidelink interface which triggering BSR is higher than a priority of the logical channel of the Uu interface which triggering BSR, when the priority parameter of the logical channel of the sidelink interface which triggering BSR is not lower than the second priority threshold and the priority parameter of the logical channel of the Uu interface which triggering BSR is not lower than the first priority threshold.

In some embodiments, the determining, by the terminal, the priority order of the logical channels of the Uu interface and the sidelink interface which triggering the BSRs, includes:

comparing, by the terminal, a priority parameter of a logical channel of the Uu interface which triggering BSR with a third priority threshold;

determining that a priority of the logical channel of the Uu interface which triggering BSR is higher than a priority of the logical channel of the sidelink interface which triggering BSR, when the priority parameter of the logical channel of the Uu interface which triggering BSR is lower than the third priority threshold; or determining that a priority of the logical channel of the sidelink interface which triggering BSR is higher than a priority of the logical channel of the Uu interface which triggering BSR, when the priority parameter of the logical channel of the Uu interface which triggering BSR is not lower than the third priority threshold.

In some embodiments, the determining, by the terminal, the priority order of the logical channels of the Uu interface and the sidelink interface which triggering the BSRs, includes:

comparing, by the terminal, a priority parameter of a logical channel of the sidelink interface which triggering BSR with a fourth priority threshold;

determining that a priority of the logical channel of the sidelink interface which triggering BSR is higher than a priority of the logical channel of the Uu interface which triggering BSR, when the priority parameter of the logical channel of the sidelink interface which triggering BSR is lower than the fourth priority threshold; or determining that a priority of the logical channel of the Uu interface which triggering BSR is higher than a priority of the logical channel of the sidelink interface which triggering BSR, when the priority parameter of the logical channel of the sidelink interface which triggering BSR is not lower than the fourth priority threshold.

In some embodiments, sending, by the terminal, the BSRs according to the priority order of the logical channels of the Uu interface and the sidelink interface which triggering the BSRs, includes:

sending a BSR of the Uu interface preferentially, when the priority of the logical channel of the Uu interface which triggering BSR is higher than the priority of the logical channel of the sidelink interface which triggering BSR; or sending a BSR of the sidelink interface preferentially, when the priority of the logical channel of the sidelink interface which triggering BSR is higher than the priority of the logical channel of the Uu interface which triggering BSR; or sending a BSR of the Uu interface and a BSR of the sidelink interface randomly, when the priority of the logical channel of the Uu interface which triggering BSR is same as the priority of the logical channel of the sidelink interface which triggering BSR.

In another embodiment of the present application provide a terminal for Buffer Status reporting, including a processor and a memory, where the memory is configured to store a program executable by the processor, and the processor is configured to read the program in the memory and perform the following steps:

determining a priority order of logical channels of a Uu interface and a sidelink interface which triggering BSRs; and sending the BSRs according to the priority order of the logical channels of the Uu interface and the sidelink interface which triggering the BSRs.

In some embodiments, the processor is configured to:

compare a priority parameter of a logical channel of the Uu interface which triggering BSR with a first priority threshold, and/or compare a priority parameter of a logical channel of the sidelink interface which triggering BSR with a second priority threshold; and determine the priority order of the logical channels of the Uu interface and the sidelink interface which triggering the BSRs according to a result of the comparing.

In some embodiments, the processor is configured to:

determine that a priority of the logical channel of the Uu interface which triggering BSR is higher than a priority of the logical channel of the sidelink interface which triggering BSR, when the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the first priority threshold and the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the Uu interface which triggering BSR is not lower than the first priority threshold and the priority parameter of the logical channel of the sidelink interface which triggering BSR is not lower than the second priority threshold.

In some embodiments, the processor is configured to:

determine that a priority of the logical channel of the sidelink interface which triggering BSR is higher than a priority of the logical channel of the Uu interface which triggering BSR, when the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the second priority threshold and the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the sidelink interface which triggering BSR is not lower than the second priority threshold and the priority parameter of the logical channel of the Uu interface which triggering BSR is not lower than the first priority threshold.

In some embodiments, the processor is configured to:

compare a priority parameter of a logical channel of the Uu interface which triggering BSR with a third priority threshold;

determine that a priority of the logical channel of the Uu interface which triggering BSR is higher than a priority of the logical channel of the sidelink interface which triggering BSR, when the priority parameter of the logical channel of the Uu interface which triggering BSR is lower than the third priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the third priority threshold.

In some embodiments, the processor is configured to:

compare a priority parameter of a logical channel of the sidelink interface which triggering BSR with a fourth priority threshold;

determine that a priority of the logical channel of the sidelink interface which triggering BSR is higher than a priority of the logical channel of the Uu interface which triggering BSR, when the priority parameter of the logical channel of the sidelink interface which triggering BSR is lower than the fourth priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the fourth priority threshold.

In some embodiments, the processor is configured to:

send a BSR of the Uu interface preferentially, when the priority of the logical channel of the Uu interface which triggering BSR is higher than the priority of the logical channel of the sidelink interface which triggering BSR; or send a BSR of the sidelink interface preferentially, when the priority of the logical channel of the sidelink interface which triggering BSR is higher than the priority of the logical channel of the Uu interface which triggering BSR; or send a BSR of the Uu interface and a BSR of the sidelink interface randomly, when the priority of the logical channel of the Uu interface which triggering BSR is same as the priority of the logical channel of the sidelink interface which triggering BSR.

In yet another embodiment of the present application further provide a device for Buffer Status reporting, including:

a priority determining module and a BSR sending module, where:

the priority determining module is configured to determine a priority order of logical channels of a Uu interface and a sidelink interface which triggering BSRs; and the BSR sending module is configured to send the BSRs according to the priority order of the logical channels of the Uu interface and the sidelink interface which triggering the BSRs.

In some embodiments, the priority determining module is configured to:

compare a priority parameter of a logical channel of the Uu interface which triggering BSR with a first priority threshold, and/or compare a priority parameter of a logical channel of the sidelink interface which triggering BSR with a second priority threshold; and determine the priority order of the logical channels of the Uu interface and the sidelink interface which triggering the BSRs according to a result of the comparing.

In some embodiments, the priority determining module is configured to:

determine that a priority of the logical channel of the Uu interface which triggering BSR is higher than a priority of the logical channel of the sidelink interface which triggering BSR, when the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the first priority threshold and the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the Uu interface which triggering BSR is not lower than the first priority threshold and the priority parameter of the logical channel of the sidelink interface which triggering BSR is not lower than the second priority threshold.

In some embodiments, the priority determining module is configured to:

determine that a priority of the logical channel of the sidelink interface which triggering BSR is higher than a priority of the logical channel of the Uu interface which triggering BSR, when the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the second priority threshold and the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the sidelink interface which triggering BSR is not lower than the second priority threshold and the priority parameter of the logical channel of the Uu interface which triggering BSR is not lower than the first priority threshold.

In some embodiments, the priority determining module is configured to:

compare a priority parameter of a logical channel of the Uu interface which triggering BSR with a third priority threshold;

determine that a priority of the logical channel of the Uu interface which triggering BSR is higher than a priority of the logical channel of the sidelink interface which triggering BSR, when the priority parameter of the logical channel of the Uu interface which triggering BSR is lower than the third priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the third priority threshold.

In some embodiments, the priority determining module is configured to:

compare a priority parameter of a logical channel of the sidelink interface which triggering BSR with a fourth priority threshold;

determine that a priority of the logical channel of the sidelink interface which triggering BSR is higher than a priority of the logical channel of the Uu interface which triggering BSR, when the priority parameter of the logical channel of the sidelink interface which triggering BSR is lower than the fourth priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the fourth priority threshold.

In some embodiments, the BSR sending module is configured to:

send a BSR of the Uu interface preferentially, when the priority of the logical channel of the Uu interface which triggering BSR is higher than the priority of the logical channel of the sidelink interface which triggering BSR; or send a BSR of the sidelink interface preferentially, when the priority of the logical channel of the sidelink interface which triggering BSR is higher than the priority of the logical channel of the Uu interface which triggering BSR; or send a BSR of the Uu interface and a BSR of the sidelink interface randomly, when the priority of the logical channel of the Uu interface which triggering BSR is same as the priority of the logical channel of the sidelink interface which triggering BSR.

In some embodiments of the present application further provide a computer storage medium storing a computer program thereon, where the program, when executed by a processor, implements the steps of the method described in the embodiments.

These and other embodiments of the present application will be more clear and easy to understand in the description of the following embodiments.

BRIEF DESCRIPTION OF THE DRAWINGS

In order to illustrate the embodiments of the present application more clearly, the accompanying figures which need to be used in describing embodiments will be introduced below briefly. The accompanying figures described below are only some embodiments of the present application.

DETAILED DESCRIPTION OF THE EMBODIMENTS

In order to make the embodiments of the present application clearer, the present application will be further illustrated below in details with reference to the accompanying figures.

A method for resource configuration during cell handover provided in embodiments of the present application may be applied to a network side device, and may also be applied to a terminal.

It should be noted that the terminal is a device with the wireless communication function, and can be deployed on land, including indoor or outdoor, handheld or vehicle-mounted; or can also be deployed on the water (such as ship, etc.); or can also be deployed in the air (e.g., on the airplane, balloon and satellite, etc.). The terminal may be: mobile phone, Pad, computer with wireless transceiver function, Virtual Reality (VR) terminal, Augmented Reality (AR) terminal, wireless terminal in the industrial control, wireless terminal in the self-driving, wireless terminal in the remote medical, wireless terminal in the smart grid, wireless terminal in the transportation safety, wireless terminal in the smart city, wireless terminal in the smart home, etc.; or may be various forms of UE, Mobile Station (MS), terminal device.

The network side device may be a 4G base station, such as LTE, eLTE, ng-eNB, etc., or may be a 5G gNB, en-gNB, macro base station, micro base station, Central Unit (CU) or Distributed Unit (DU), etc.

The term "and/or" in the embodiments of the present application describes the association relationship of associated objects, indicating that there may be three relationships, for example, A and/or B may represent: only A, both A and B, and only B. The character "I" generally indicates that the associated objects have a kind of "or" relationship.

The application scenarios described in embodiments of the present application are intended to illustrate embodiments of the present application more clearly, and do not constitute a limitation on the embodiments of the present application.

The relevant background of the cellular network communication and sidelink will be introduced at first below.

Figure 1:
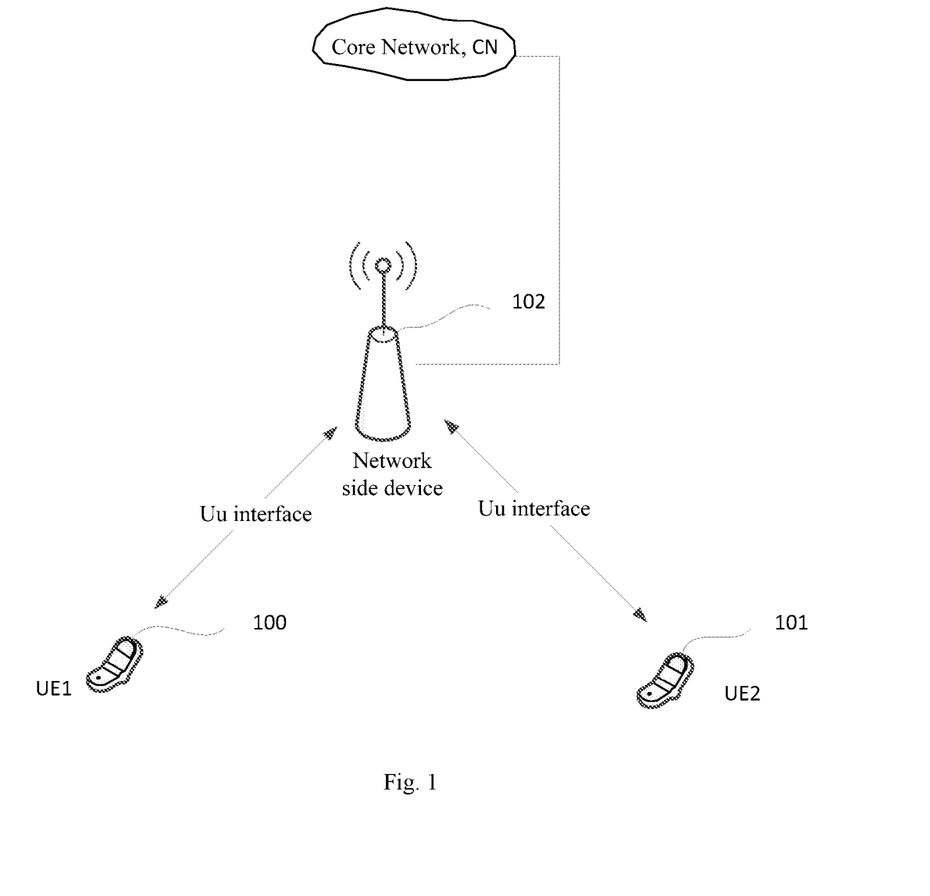
FIG. 1 is a schematic diagram of a communication mode of a cellular network according to an embodiment of the present application.

As shown in FIG. 1, a cellular network communication method is used in the traditional wireless communication, that is, the transmission of the uplink and downlink data information or control information is performed between a terminal 100 and a network side device 102 through the Uu interface, and the transmission of the uplink and downlink data information or control information is performed between a terminal 101 and the network side device 102.

Figure 2:
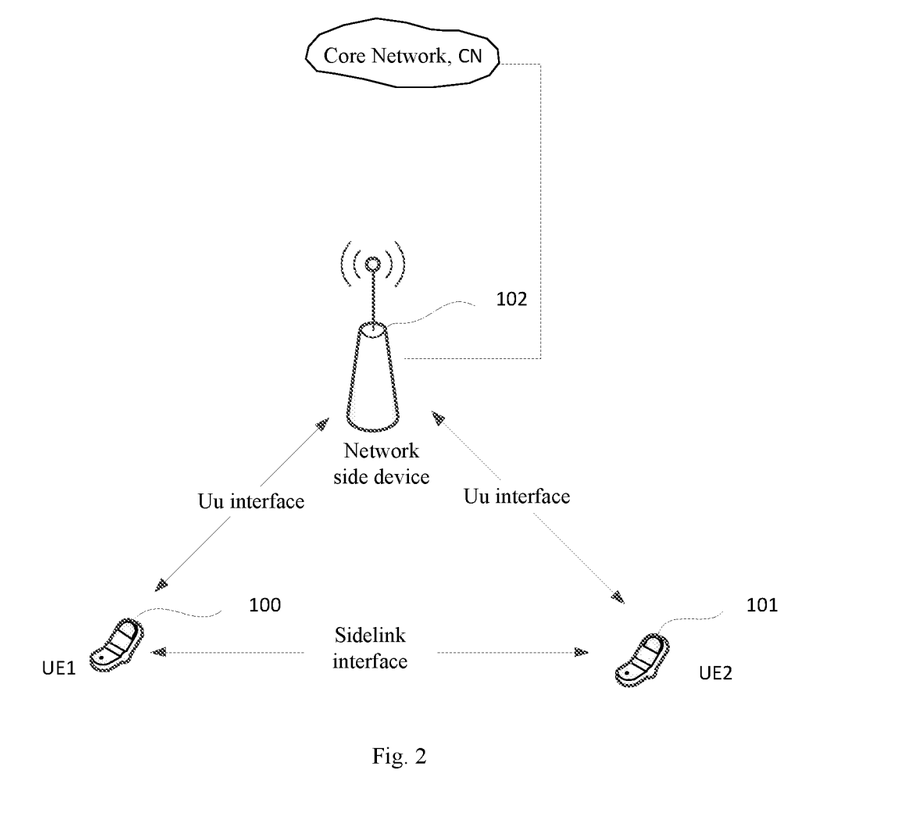
FIG. 2 is a schematic diagram of a sidelink mode according to an embodiment of the present application.

As shown in FIG. 2, the sidelink refers to a way in which neighboring terminals can transmit data through a sidelink (also called Sidelink) within a short range, and the radio interface corresponding to the Sidelink is called sidelink interface, which is also called Sidelink interface. The terminal 100 and the terminal 101 that are close to each other allow the sidelink between devices.

The Buffer Status reporting (BSR) is used to provide a serving base station with how much data to be sent by a terminal is stored in the to-be-sent buffer, so that the serving base station schedules uplink resources. When the terminal determines that there is uplink data to be sent in a logical channel, the sending of a BSR message may be triggered.

The LCP mechanism of the LTE system will be illustrated below.

The Logical Channel Prioritization (LCP) is a process in which a terminal organizes uplink data packets for a uplink scheduling grant (UL grant) allocated by the network side.

In the LCP process, the priority sequence between the Media Access Control-Control Element (MAC CE) and the data from logical channels is fixed, and the priority sequence is as follows:

MAC control element for C-RNTI (Cell-Radio Network Temporary Identifier) or data from UL-CCCH (Uplink Common Control CHannel);

MAC control element for DPR (Data capacity and Power headroom Report);

MAC control element for SPS (Semi-Persistent Scheduling) confirmation;

MAC control element for AUL (Automatic Uplink) confirmation;

MAC control element for BSR, with exception of BSR included for padding;

MAC control element for PHR (Power Headroom Report), Extended PHR, or Dual Connectivity PHR;

MAC control element for Sidelink BSR, with exception of Sidelink BSR included for padding;

Data from any Logical Channel, except data from UL-CCCH;

MAC control element for Recommended bit rate query;

MAC control element for BSR included for padding;

MAC control element for Sidelink BSR included for padding.

For the data from logical channels, the specific LCP process is as follows.

Step 1: performing a first round of resource allocation in a descending order of priority parameters of all logical channels with tokens.

The first round of resource allocation is based on the Prioritized Bit Rate (PBR) of each logical channel, and the number of tokens available for each logical channel is updated according to the resource allocation.

Step 2: performing a second round of resource allocation if there are remaining resources.

The second round of resource allocation is to allocate resources for the data other than PBR in a descending order of priority parameters of all logical channels with data transmission, and the resource allocation ends until the data of all logical channels with tokens is allocated with resources or the resources run out.

It can be seen from the above LCP mechanism of the LTE system that the priority order is fixed for the BSR MAC CE of the sidelink interface and the BSR MAC CE of the Uu interface at present, that is, the priority of the BSR MAC CE of the Uu interface is always higher than that of the BSR MAC CE of the sidelink interface. That is to say, if the resources allocated by the base station are not enough, the terminal will always send the BSR MAC CE of the Uu interface preferentially, thus affecting the transmission delay of sidelink interface services.

In order to solve the above problem, the present application proposes a method for Buffer Status reporting, which ensures that the terminal can determine the sending of the BSR of the sidelink interface and the BSR of the Uu interface dynamically when it needs to send the BSR of the sidelink interface and the BSR of the Uu interface simultaneously, and ensures that the quality of service of the Uu interface and Sidelink interface services can be applied to a system including a terminal and a network side device. The implementation steps of the system will be illustrated below.

Figure 3:
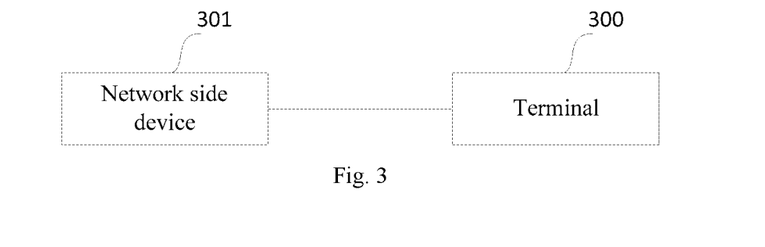
FIG. 3 is a system for Buffer Status reporting according to an embodiment of the present application.

As shown in FIG. 3, the system includes a terminal 300 and a network side device 301. Taking the LCP process of the NR system as an example, an interaction process between the terminal 300 and the network side device 301 during the Buffer Status reporting process is illustrated.

Figure 4:
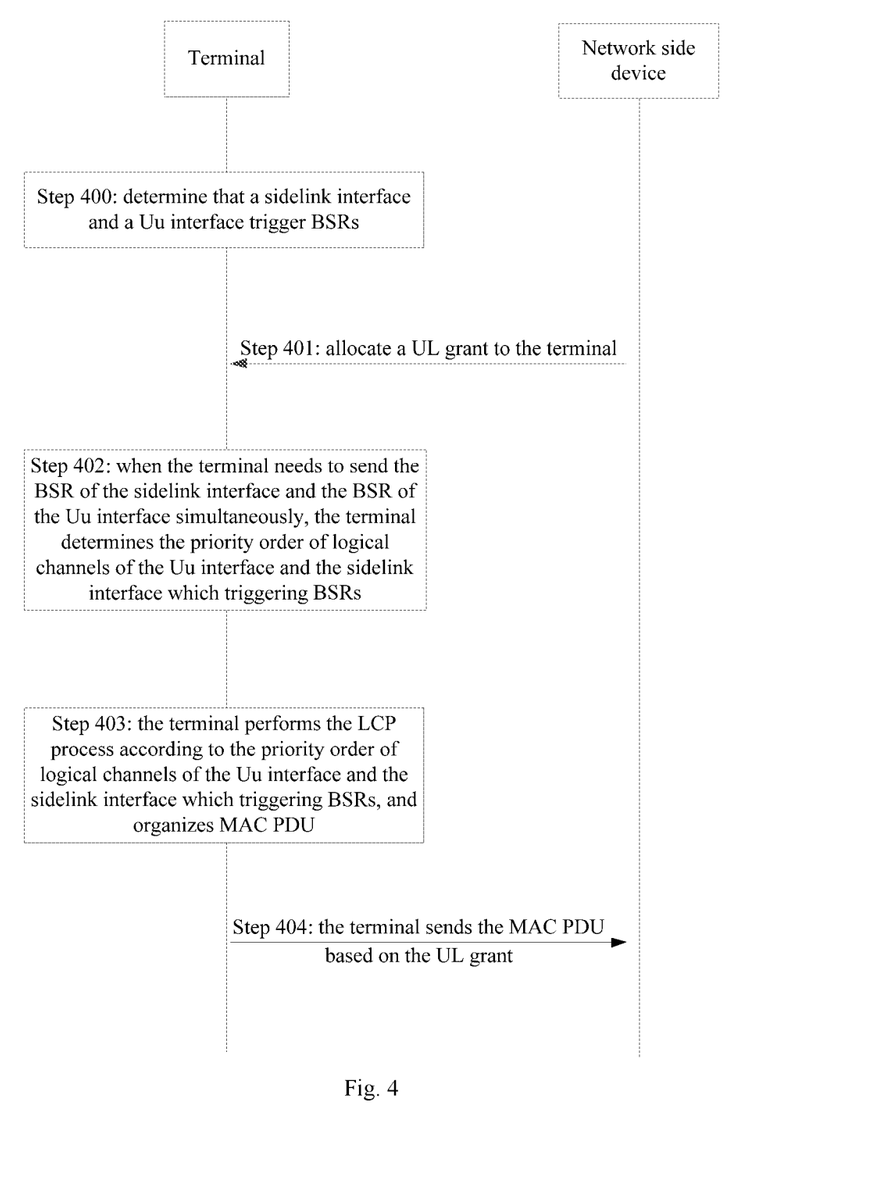
FIG. 4 is a schematic diagram of interaction of Buffer Status reporting according to an embodiment of the present application.

As shown in FIG. 4, the interaction process between the terminal and the network side device during the Buffer Status reporting process is as follows.

Step 400: the terminal determines that a sidelink interface and a Uu interface trigger BSRs according to the existing protocol standard.

Step 401: the network side device allocates a UL grant to the terminal.

Step 402: if the terminal needs to send the BSR of the sidelink interface and the BSR of the Uu interface simultaneously, the terminal determines the priority order of logical channels of the Uu interface and the sidelink interface which triggering BSRs.

Step 403: the terminal performs the LCP process according to the priority order of logical channels of the Uu interface and the sidelink interface which triggering BSRs, and organizes the Medium Access Control (MAC) Protocol Data Unit (PDU).

In an implementation, if the UL grant can only carry the BSR MAC CE of one interface, the terminal may implement in the following manner.

When the priority of the logical channel of the Uu interface which triggering BSR determined according to step 402 is higher, the UL grant carries the BSR MAC CE of the Uu interface, and the terminal only cancels the pending Up Link Scheduling Request (UL SR) and stops the SR prohibition timer corresponding to the UL SR.

When the priority of the logical channel of the sidelink interface which triggering BSR determined according to step 402 is higher, the UL grant carries the BSR MAC CE of the sidelink (sidelink interface), and the terminal only cancels the pending sidelink SR and stops the SR prohibition timer corresponding to the sidelink SR.

Step 404: the terminal sends the MAC PDU based on the UL grant.

In some embodiments, the terminal determines the priority order of the logical channels of the Uu interface and the sidelink interface which triggering BSRs in any one of the following ways.

In a first way: the terminal preferentially compares a priority parameter of the logical channel of the Uu interface which triggering BSR with a first priority threshold.

When the priority parameter of the logical channel of the Uu interface which triggering BSR is lower than the first priority threshold, it is determined that the priority of the logical channel of the Uu interface which triggering BSR is higher than the priority of the logical channel of the sidelink interface which triggering BSR.

When the priority parameter of the logical channel of the Uu interface which triggering BSR is not lower than the first priority threshold, the terminal then compares a priority parameter of the logical channel of the sidelink interface which triggering BSR with a second priority threshold, as follows:

when the priority parameter of the logical channel of the Uu interface which triggering BSR is not lower than the first priority threshold and the priority parameter of the logical channel of the sidelink interface which triggering BSR is lower than the second priority threshold, it is determined that the priority of the logical channel of the sidelink interface which triggering BSR is higher than the priority of the logical channel of the Uu interface which triggering BSR; or when the priority parameter of the logical channel of the Uu interface which triggering BSR is not lower than the first priority threshold and the priority parameter of the logical channel of the sidelink interface which triggering BSR is not lower than the second priority threshold, it is determined that the priority of the logical channel of the Uu interface which triggering BSR is higher than the priority of the logical channel of the sidelink interface which triggering BSR.

In a second way: the terminal preferentially compares a priority parameter of the logical channel of the sidelink interface which triggering BSR with a second priority threshold.

When the priority parameter of the logical channel of the sidelink interface which triggering BSR is lower than the second priority threshold, it is determined that the priority of the logical channel of the sidelink interface which triggering BSR is higher than the priority of the logical channel of the Uu interface which triggering BSR.

When the priority parameter of the logical channel of the sidelink interface which triggering BSR is not lower than the second priority threshold, the terminal then compares a priority parameter of the logical channel of the Uu interface which triggering BSR with a first priority threshold, specifically as follows:

when the priority parameter of the logical channel of the sidelink interface which triggering BSR is not lower than the second priority threshold and the priority parameter of the logical channel of the Uu interface which triggering BSR is lower than the first priority threshold, it is determined that the priority of the logical channel of the Uu interface which triggering BSR is higher than the priority of the logical channel of the sidelink interface which triggering BSR; or when the priority parameter of the logical channel of the sidelink interface which triggering BSR is not lower than the second priority threshold and the priority parameter of the logical channel of the Uu interface which triggering BSR is not lower than the first priority threshold, it is determined that the priority of the logical channel of the sidelink interface which triggering BSR is higher than the priority of the logical channel of the Uu interface which triggering BSR.

In some embodiments, the above-mentioned first and second priority thresholds may be a same threshold value or may be different threshold values, which is not excessively limited here.

In a third way: the terminal compares a priority parameter of the logical channel of the Uu interface which triggering BSR with a third priority threshold;

when the priority parameter of the logical channel of the Uu interface which triggering BSR is lower than the third priority threshold, it is determined that the priority of the logical channel of the Uu interface which triggering BSR is higher than the priority of the logical channel of the sidelink interface which triggering BSR; or when the priority parameter of the logical channel of the Uu interface which triggering BSR is not lower than the third priority threshold, it is determined that the priority of the logical channel of the sidelink interface which triggering BSR is higher than the priority of the logical channel of the Uu interface which triggering BSR.

In a fourth way: the terminal compares a priority parameter of the logical channel of the sidelink interface which triggering BSR with a fourth priority threshold;

when the priority parameter of the logical channel of the sidelink interface which triggering BSR is lower than the fourth priority threshold, it is determined that the priority of the logical channel of the sidelink interface which triggering BSR is higher than the priority of the logical channel of the Uu interface which triggering BSR; or when the priority parameter of the logical channel of the sidelink interface which triggering BSR is not lower than the fourth priority threshold, it is determined that the priority of the logical channel of the Uu interface which triggering BSR is higher than the priority of the logical channel of the sidelink interface which triggering BSR.

The first priority threshold and the third priority threshold in some embodiments may be a same threshold value or different threshold values, the second priority threshold and the fourth priority threshold in some embodiments may be a same threshold value or different threshold values, and the third priority threshold and the fourth priority threshold in some embodiments may be a same threshold value or different threshold values, which are not excessively limited here.

The first priority threshold, the second priority threshold, the third priority threshold and the fourth priority threshold in some embodiments may be configured by the network device, or pre-configured, or specified by the protocol standard, which is not excessively limited here.

After determining the priority order of the logical channels of the Uu interface and the sidelink interface which triggering BSRs in any one of the above ways, the terminal sends BSRs according to the priority order of the logical channels of the Uu interface and the sidelink interface which triggering BSRs. The specific cases of sending BSRs are as follows:

Case 1: sending a BSR of the Uu interface preferentially, when the priority of the logical channel of the Uu interface which triggering BSR is higher than the priority of the logical channel of the sidelink interface which triggering BSR; or Case 2: sending a BSR of the sidelink interface preferentially, when the priority of the logical channel of the sidelink interface which triggering BSR is higher than the priority of the logical channel of the Uu interface which triggering BSR; or Case 3: sending a BSR of the Uu interface and a BSR of the sidelink interface randomly, when the priority of the logical channel of the Uu interface which triggering BSR is same as the priority of the logical channel of the sidelink interface which triggering BSR.

For example, the terminal generates a random number between 0 and 1. If the random number is lower than 0.5, the BSR of the Uu interface will be sent preferentially; otherwise, the BSR of the sidelink interface will be sent preferentially.

The priority parameters of the logical channels of the Uu interface and the sidelink interface defined in this embodiment are shown in Table 1.

TABLE 1

| Priority parameter in RLC bearer configuration information corresponding to SRB or DRB of Uu interface | Priority parameter in RLC bearer configuration information corresponding to SRB or DRB of sidelink interface |
|---|---|
| 0-1 | 0 |
| 2-3 | 1 |
| 4-5 | 2 |
| 6-7 | 3 |
| 8-9 | 4 |
| 10-11 | 5 |
| 12-13 | 6 |
| 14-15 | 7 |

Here, Signaling Radio Bearer (SRB); Data Radio Bearer (DRB); Radio Link Control (RLC).

With reference to Table 1, the process in which the terminal determines the priority order of the logical channels of the Uu interface and the sidelink interface which triggering BSRs in the above first way will be illustrated:

for example, the first priority threshold is configured as 6 and the second priority threshold is configured as 3;

when the priority parameter of the logical channel of the Uu interface which triggering BSR is 2, it is determined that the priority of the logical channel of the Uu interface which triggering BSR is higher than the priority of the logical channel of the sidelink interface which triggering BSR according to the fact that 2 is lower than 6; or when the priority parameter of the logical channel of the Uu interface which triggering BSR is 10 and the priority parameter of the logical channel of the sidelink interface which triggering BSR is 1, it is determined that the priority of the logical channel of the sidelink interface which triggering BSR is higher than the priority of the logical channel of the Uu interface which triggering BSR according to the fact that 10 is greater than 2 and 1 is lower than 3; or when the priority parameter of the logical channel of the Uu interface which triggering BSR is 10 and the priority parameter of the logical channel of the sidelink interface which triggering BSR is 6, it is determined that the priority of the logical channel of the Uu interface which triggering BSR is higher than the priority of the logical channel of the sidelink interface which triggering BSR according to the fact that 10 is greater than 2 and 6 is greater than 3.

With reference to Table 1, the process in which the terminal determines the priority order of the logical channels of the Uu interface and the sidelink interface which triggering BSRs in the above second way will be illustrated:

for example, the first priority threshold is configured as 6 and the second priority threshold is configured as 3;

when the priority parameter of the logical channel of the sidelink interface which triggering BSR is 1, it is determined that the priority of the logical channel of the sidelink interface which triggering BSR is higher than the priority of the logical channel of the Uu interface which triggering BSR according to the fact that 1 is lower than 3; or when the priority parameter of the logical channel of the sidelink interface which triggering BSR is 5 and the priority parameter of the logical channel of the Uu interface which triggering BSR is 2, it is determined that the priority of the logical channel of the Uu interface which triggering BSR is higher than the priority of the logical channel of the sidelink interface which triggering BSR according to the fact that 5 is greater than 3 and 2 is lower than 6.

When the priority parameter of the logical channel of the sidelink interface which triggering BSR is 5 and the priority parameter of the logical channel of the Uu interface which triggering BSR is 8, it is determined that the priority of the logical channel of the sidelink interface which triggering BSR is higher than the priority of the logical channel of the Uu interface which triggering BSR according to the fact that 5 is greater than 3 and 8 is greater than 6.

With reference to Table 1, the process in which the terminal determines the priority order of the logical channels of the Uu interface and the sidelink interface which triggering BSRs in the above third way will be specifically illustrated:

for example, the third priority threshold is configured as 6;

when the priority parameter of the logical channel of the Uu interface which triggering BSR is 2, it is determined that the priority of the logical channel of the Uu interface which triggering BSR is higher than the priority of the logical channel of the sidelink interface which triggering BSR according to the fact that 2 is lower than 6; or when the priority parameter of the logical channel of the Uu interface which triggering BSR is 10, it is determined that the priority of the logical channel of the sidelink interface which triggering BSR is higher than the priority of the logical channel of the Uu interface which triggering BSR according to the fact that 10 is greater than 6.

With reference to Table 1, the process in which the terminal determines the priority order of the logical channels of the Uu interface and the sidelink interface which triggering BSRs in the above fourth way will be specifically illustrated:

for example, the fourth priority threshold is configured as 3;

when the priority parameter of the logical channel of the sidelink interface which triggering BSR is 1, it is determined that the priority of the logical channel of the sidelink interface which triggering BSR is higher than the priority of the logical channel of the Uu interface which triggering BSR according to the fact that 1 is lower than 3; or when the priority parameter of the logical channel of the sidelink interface which triggering BSR is 5, it is determined that the priority of the logical channel of the Uu interface which triggering BSR is higher than the priority of the logical channel of the sidelink interface which triggering BSR according to the fact that 5 is greater than 3.

Figure 5:
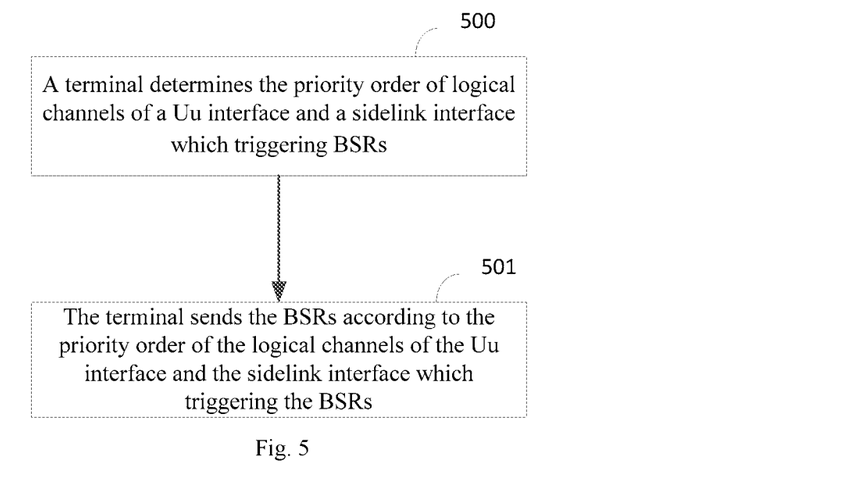
FIG. 5 is a flowchart of a method for Buffer Status reporting according to an embodiment of the present application.

As shown in FIG. 5, embodiments of the present application provide a method for Buffer Status reporting, including:

Step 500: a terminal determines the priority order of logical channels of a Uu interface and a sidelink interface which triggering BSRs; and Step 501: the terminal sends the BSRs according to the priority order of the logical channels of the Uu interface and the sidelink interface which triggering the BSRs.

In some embodiments, the step in which the terminal determines the priority order of the logical channels of the Uu interface and the sidelink interface which triggering the BSRs, includes:

the terminal compares a priority parameter of a logical channel of the Uu interface which triggering BSR with a first priority threshold, and/or compares a priority parameter of a logical channel of the sidelink interface which triggering BSR with a second priority threshold; and the terminal determines the priority order of the logical channels of the Uu interface and the sidelink interface which triggering the BSRs according to a result of the comparing.

In some embodiments, the step in which the terminal determines the priority order of the logical channels of the Uu interface and the sidelink interface which triggering the BSRs according to the result of the comparing, includes:

determining that a priority of the logical channel of the Uu interface which triggering BSR is higher than a priority of the logical channel of the sidelink interface which triggering BSR, when the priority parameter of the logical channel of the Uu interface which triggering BSR is lower than the first priority threshold; or determining that a priority of the logical channel of the sidelink interface which triggering BSR is higher than a priority of the logical channel of the Uu interface which triggering BSR, when the priority parameter of the logical channel of the Uu interface which triggering BSR is not lower than the first priority threshold and the priority parameter of the logical channel of the sidelink interface which triggering BSR is lower than the second priority threshold; or determining that a priority of the logical channel of the Uu interface which triggering BSR is higher than a priority of the logical channel of the sidelink interface which triggering BSR, when the priority parameter of the logical channel of the Uu interface which triggering BSR is not lower than the first priority threshold and the priority parameter of the logical channel of the sidelink interface which triggering BSR is not lower than the second priority threshold.

In some embodiments, the step in which the terminal determines the priority order of the logical channels of the Uu interface and the sidelink interface which triggering the BSRs according to the result of the comparing, includes:

determining that a priority of the logical channel of the sidelink interface which triggering BSR is higher than a priority of the logical channel of the Uu interface which triggering BSR, when the priority parameter of the logical channel of the sidelink interface which triggering BSR is lower than the second priority threshold; or determining that a priority of the logical channel of the Uu interface which triggering BSR is higher than a priority of the logical channel of the sidelink interface which triggering BSR, when the priority parameter of the logical channel of the sidelink interface which triggering BSR is not lower than the second priority threshold and the priority parameter of the logical channel of the Uu interface which triggering BSR is lower than the first priority threshold; or determining that a priority of the logical channel of the sidelink interface which triggering BSR is higher than a priority of the logical channel of the Uu interface which triggering BSR, when the priority parameter of the logical channel of the sidelink interface which triggering BSR is not lower than the second priority threshold and the priority parameter of the logical channel of the Uu interface which triggering BSR is not lower than the first priority threshold.

In some embodiments, the step in which the terminal determines the priority order of the logical channels of the Uu interface and the sidelink interface which triggering the BSRs, includes:

the terminal compares a priority parameter of a logical channel of the Uu interface which triggering BSR with a third priority threshold;

determining that a priority of the logical channel of the Uu interface which triggering BSR is higher than a priority of the logical channel of the sidelink interface which triggering BSR, when the priority parameter of the logical channel of the Uu interface which triggering BSR is lower than the third priority threshold; or determining that a priority of the logical channel of the sidelink interface which triggering BSR is higher than a priority of the logical channel of the Uu interface which triggering BSR, when the priority parameter of the logical channel of the Uu interface which triggering BSR is not lower than the third priority threshold.

In some embodiments, the step in which the terminal determines the priority order of the logical channels of the Uu interface and the sidelink interface which triggering the BSRs, includes:

the terminal compares a priority parameter of a logical channel of the sidelink interface which triggering BSR with a fourth priority threshold;

determining that a priority of the logical channel of the sidelink interface which triggering BSR is higher than a priority of the logical channel of the Uu interface which triggering BSR, when the priority parameter of the logical channel of the sidelink interface which triggering BSR is lower than the fourth priority threshold; or determining that a priority of the logical channel of the Uu interface which triggering BSR is higher than a priority of the logical channel of the sidelink interface which triggering BSR, when the priority parameter of the logical channel of the sidelink interface which triggering BSR is not lower than the fourth priority threshold.

In some embodiments, the step in which the terminal sends the BSRs according to the priority order of the logical channels of the Uu interface and the sidelink interface which triggering the BSRs, includes:

sending a BSR of the Uu interface preferentially, when the priority of the logical channel of the Uu interface which triggering BSR is higher than the priority of the logical channel of the sidelink interface which triggering BSR; or sending a BSR of the sidelink interface preferentially, when the priority of the logical channel of the sidelink interface which triggering BSR is higher than the priority of the logical channel of the Uu interface which triggering BSR; or sending a BSR of the Uu interface and a BSR of the sidelink interface randomly, when the priority of the logical channel of the Uu interface which triggering BSR is same as the priority of the logical channel of the sidelink interface which triggering BSR.

Based on the same inventive concept, embodiments of the present application further provide a terminal for Buffer Status reporting. Since this terminal is a terminal corresponding to the method in embodiments of the present application and the principle of this terminal to solve the problem is similar to that of the method, the implementations of this terminal can refer to the implementations of the method, and the repeated description thereof will be omitted here.

Figure 6:
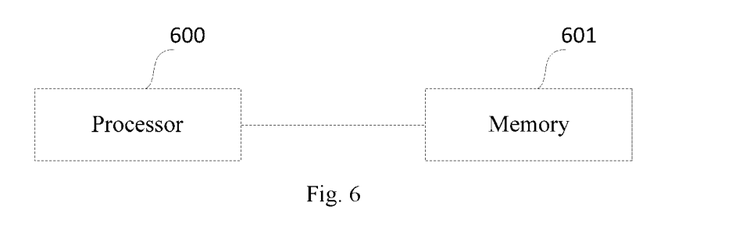
FIG. 6 is a schematic diagram of a terminal for Buffer Status reporting according to an embodiment of the present application.

As shown in FIG. 6, the terminal includes: a processor 600 and a memory 601, where the memory 601 is configured to store a program executable by the processor 600, and the processor 600 is configured to read the program in the memory 601 and perform the following steps:

determining a priority order of logical channels of a Uu interface and a sidelink interface which triggering BSRs; and sending the BSRs according to the priority order of the logical channels of the Uu interface and the sidelink interface which triggering the BSRs.

In some embodiments, the processor 600 is configured to:

compare a priority parameter of a logical channel of the Uu interface which triggering BSR with a first priority threshold, and/or compare a priority parameter of a logical channel of the sidelink interface which triggering BSR with a second priority threshold; and determine the priority order of the logical channels of the Uu interface and the sidelink interface which triggering the BSRs according to a result of the comparing.

In some embodiments, the processor 600 is configured to:

determine that a priority of the logical channel of the Uu interface which triggering BSR is higher than a priority of the logical channel of the sidelink interface which triggering BSR, when the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the first priority threshold and the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the Uu interface which triggering BSR is not lower than the first priority threshold and the priority parameter of the logical channel of the sidelink interface which triggering BSR is not lower than the second priority threshold.

In some embodiments, the processor 600 is configured to:

determine that a priority of the logical channel of the sidelink interface which triggering BSR is higher than a priority of the logical channel of the Uu interface which triggering BSR, when the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the second priority threshold and the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the sidelink interface which triggering BSR is not lower than the second priority threshold and the priority parameter of the logical channel of the Uu interface which triggering BSR is not lower than the first priority threshold.

In some embodiments, the processor 600 is configured to:

compare a priority parameter of a logical channel of the Uu interface which triggering BSR with a third priority threshold;

determine that a priority of the logical channel of the Uu interface which triggering BSR is higher than a priority of the logical channel of the sidelink interface which triggering BSR, when the priority parameter of the logical channel of the Uu interface which triggering BSR is lower than the third priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the third priority threshold.

In some embodiments, the processor 600 is configured to:

compare a priority parameter of a logical channel of the sidelink interface which triggering BSR with a fourth priority threshold;

determine that a priority of the logical channel of the sidelink interface which triggering BSR is higher than a priority of the logical channel of the Uu interface which triggering BSR, when the priority parameter of the logical channel of the sidelink interface which triggering BSR is lower than the fourth priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the fourth priority threshold.

In some embodiments, the processor 600 is configured to:

send a BSR of the Uu interface preferentially, when the priority of the logical channel of the Uu interface which triggering BSR is higher than the priority of the logical channel of the sidelink interface which triggering BSR; or send a BSR of the sidelink interface preferentially, when the priority of the logical channel of the sidelink interface which triggering BSR is higher than the priority of the logical channel of the Uu interface which triggering BSR; or send a BSR of the Uu interface and a BSR of the sidelink interface randomly, when the priority of the logical channel of the Uu interface which triggering BSR is same as the priority of the logical channel of the sidelink interface which triggering BSR.

Based on the same inventive concept, embodiments of the present application further provide a device for Buffer Status reporting. Since this device is a device corresponding to the method in the embodiments of the present application and the principle of this device to solve the problem is similar to that of the method, the implementations of this device can refer to the implementations of the method, and the repeated description thereof will be omitted here.

Figure 7:
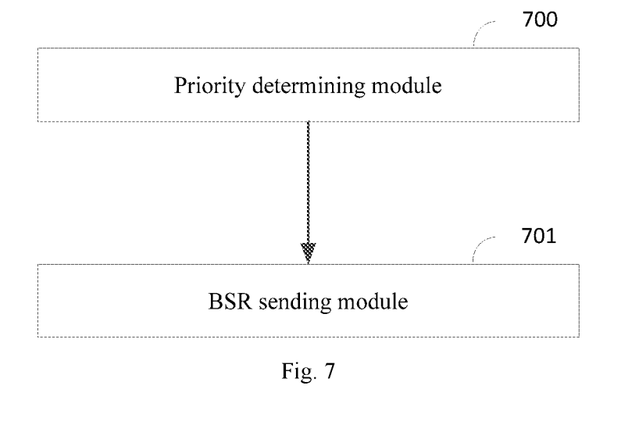
FIG. 7 is a schematic diagram of a device for Buffer Status reporting according to an embodiment of the present application.

As shown in FIG. 7, the device includes a priority determining module 700 and a BSR sending module 701, where:

the priority determining module 700 is configured to determine a priority order of logical channels of a Uu interface and a sidelink interface which triggering BSRs; and the BSR sending module 701 is configured to send the BSRs according to the priority order of the logical channels of the Uu interface and the sidelink interface which triggering the BSRs.

In some embodiments, the priority determining module 700 is configured to:

compare a priority parameter of a logical channel of the Uu interface which triggering BSR with a first priority threshold, and/or compare a priority parameter of a logical channel of the sidelink interface which triggering BSR with a second priority threshold; and determine the priority order of the logical channels of the Uu interface and the sidelink interface which triggering the BSRs according to a result of the comparing.

In some embodiments, the priority determining module 700 is configured to:

determine that a priority of the logical channel of the Uu interface which triggering BSR is higher than a priority of the logical channel of the sidelink interface which triggering BSR, when the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the first priority threshold and the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the Uu interface which triggering BSR is not lower than the first priority threshold and the priority parameter of the logical channel of the sidelink interface which triggering BSR is not lower than the second priority threshold.

In some embodiments, the priority determining module 700 is configured to:

determine that a priority of the logical channel of the sidelink interface which triggering BSR is higher than a priority of the logical channel of the Uu interface which triggering BSR, when the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the second priority threshold and the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the sidelink interface which triggering BSR is not lower than the second priority threshold and the priority parameter of the logical channel of the Uu interface which triggering BSR is not lower than the first priority threshold.

In some embodiments, the priority determining module 700 is configured to:

compare a priority parameter of a logical channel of the Uu interface which triggering BSR with a third priority threshold;

determine that a priority of the logical channel of the Uu interface which triggering BSR is higher than a priority of the logical channel of the sidelink interface which triggering BSR, when the priority parameter of the logical channel of the Uu interface which triggering BSR is lower than the third priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the third priority threshold.

In some embodiments, the priority determining module 700 is configured to:

compare a priority parameter of a logical channel of the sidelink interface which triggering BSR with a fourth priority threshold;

determine that a priority of the logical channel of the sidelink interface which triggering BSR is higher than a priority of the logical channel of the Uu interface which triggering BSR, when the priority parameter of the logical channel of the sidelink interface which triggering BSR is lower than the fourth priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the fourth priority threshold.

In some embodiments, the BSR sending module 701 is configured to:

send a BSR of the Uu interface preferentially, when the priority of the logical channel of the Uu interface which triggering BSR is higher than the priority of the logical channel of the sidelink interface which triggering BSR; or send a BSR of the sidelink interface preferentially, when the priority of the logical channel of the sidelink interface which triggering BSR is higher than the priority of the logical channel of the Uu interface which triggering BSR; or send a BSR of the Uu interface and a BSR of the sidelink interface randomly, when the priority of the logical channel of the Uu interface which triggering BSR is same as the priority of the logical channel of the sidelink interface which triggering BSR.

Embodiments further provide a computer storage medium, where the program, when executed by a processor, implements the steps of the following method:

a terminal determines a priority order of logical channels of a Uu interface and a sidelink interface which triggering BSRs; and the terminal sends the BSRs according to the priority order of the logical channels of the Uu interface and the sidelink interface which triggering the BSRs.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A method for Buffer Status reporting, comprising:
   determining, by a terminal, a priority order of logical channels of a Uu interface and a sidelink interface which triggering Buffer Status reportings, BSRs; and
   sending, by the terminal, the BSRs according to the priority order of the logical channels of the Uu interface and the sidelink interface which triggering the BSRs;
   wherein the determining, by the terminal, the priority order of the logical channels of the Uu interface and the sidelink interface which triggering the BSRs, comprises:
   comparing, by the terminal, a priority parameter of a logical channel of the Uu interface which triggering BSR with a first priority threshold, and comparing, by the terminal, a priority parameter of a logical channel of the sidelink interface which triggering BSR with a second priority threshold; and determining, by the terminal, the priority order of the logical channels of the Uu interface and the sidelink interface which triggering the BSRs according to a result of the comparing;

wherein the first priority threshold is a priority threshold related to the Uu interface, and the second priority threshold is a priority threshold related to the sidelink interface.

2. The method according to claim 1, wherein the determining, by the terminal, the priority order of the logical channels of the Uu interface and the sidelink interface which triggering the BSRs according to the result of the comparing, comprises:

determining that a priority of the logical channel of the Uu interface which triggering BSR is higher than a priority of the logical channel of the sidelink interface which triggering BSR, when the priority parameter of the logical channel of the Uu interface which triggering BSR is lower than the first priority threshold; or determining that a priority of the logical channel of the sidelink interface which triggering BSR is higher than a priority of the logical channel of the Uu interface which triggering BSR, when the priority parameter of the logical channel of the Uu interface which triggering BSR is not lower than the first priority threshold and the priority parameter of the logical channel of the sidelink interface which triggering BSR is lower than the second priority threshold; or determining that a priority of the logical channel of the Uu interface which triggering BSR is higher than a priority of the logical channel of the sidelink interface which triggering BSR, when the priority parameter of the logical channel of the Uu interface which triggering BSR is not lower than the first priority threshold and the priority parameter of the logical channel of the sidelink interface which triggering BSR is not lower than the second priority threshold.

3. The method according to claim 1, wherein the determining, by the terminal, the priority order of the logical channels of the Uu interface and the sidelink interface which triggering the BSRs according to the result of the comparing, comprises:

determining that a priority of the logical channel of the sidelink interface which triggering BSR is higher than a priority of the logical channel of the Uu interface which triggering BSR, when the priority parameter of the logical channel of the sidelink interface which triggering BSR is lower than the second priority threshold; or determining that a priority of the logical channel of the Uu interface which triggering BSR is higher than a priority of the logical channel of the sidelink interface which triggering BSR, when the priority parameter of the logical channel of the sidelink interface which triggering BSR is not lower than the second priority threshold and the priority parameter of the logical channel of the Uu interface which triggering BSR is lower than the first priority threshold; or determining that a priority of the logical channel of the sidelink interface which triggering BSR is higher than a priority of the logical channel of the Uu interface which triggering BSR, when the priority parameter of the logical channel of the sidelink interface which triggering BSR is not lower than the second priority threshold and the priority parameter of the logical channel of the Uu interface which triggering BSR is not lower than the first priority threshold.

4. The method according to claim 1, wherein the determining, by the terminal, the priority order of the logical channels of the Uu interface and the sidelink interface which triggering the BSRs, comprises:

comparing, by the terminal, a priority parameter of a logical channel of the Uu interface which triggering BSR with a third priority threshold;

determining that a priority of the logical channel of the Uu interface which triggering BSR is higher than a priority of the logical channel of the sidelink interface which triggering BSR, when the priority parameter of the logical channel of the Uu interface which triggering BSR is lower than the third priority threshold; or determining that a priority of the logical channel of the sidelink interface which triggering BSR is higher than a priority of the logical channel of the Uu interface which triggering BSR, when the priority parameter of the logical channel of the Uu interface which triggering BSR is not lower than the third priority threshold.

5. The method according to claim 1, wherein the determining, by the terminal, the priority order of the logical channels of the Uu interface and the sidelink interface which triggering the BSRs, comprises:

comparing, by the terminal, a priority parameter of a logical channel of the sidelink interface which triggering BSR with a fourth priority threshold;

determining that a priority of the logical channel of the sidelink interface which triggering BSR is higher than a priority of the logical channel of the Uu interface which triggering BSR, when the priority parameter of the logical channel of the sidelink interface which triggering BSR is lower than the fourth priority threshold; or determining that a priority of the logical channel of the Uu interface which triggering BSR is higher than a priority of the logical channel of the sidelink interface which triggering BSR, when the priority parameter of the logical channel of the sidelink interface which triggering BSR is not lower than the fourth priority threshold.

6. The method according to claim 1, wherein the sending, by the terminal, the BSRs according to the priority order of the logical channels of the Uu interface and the sidelink interface which triggering the BSRs, comprises:

sending a BSR of the Uu interface preferentially, when the priority of the logical channel of the Uu interface which triggering BSR is higher than the priority of the logical channel of the sidelink interface which triggering BSR; or sending a BSR of the sidelink interface preferentially, when the priority of the logical channel of the sidelink interface which triggering BSR is higher than the priority of the logical channel of the Uu interface which triggering BSR; or sending a BSR of the Uu interface and a BSR of the sidelink interface randomly, when the priority of the logical channel of the Uu interface which triggering BSR is same as the priority of the logical channel of the sidelink interface which triggering BSR.

7. A computer storage medium storing a computer program thereon, wherein the program, when executed by a processor, implements the method of claim 1.

8. A terminal for Buffer Status reporting, comprising a processor and a memory, wherein the memory is configured to store a program executable by the processor, and the processor is configured to read the program in the memory and perform following steps:

determining a priority order of logical channels of a Uu interface and a sidelink interface which triggering Buffer Status reportings, BSRs; and sending the BSRs according to the priority order of the logical channels of the Uu interface and the sidelink interface which triggering the BSRs;

wherein the processor is configured to:

compare a priority parameter of a logical channel of the Uu interface which triggering BSR with a first priority threshold, and compare a priority parameter of a logical channel of the sidelink interface which triggering BSR with a second priority threshold; and determine the priority order of the logical channels of the Uu interface and the sidelink interface which triggering the BSRs according to a result of the comparing;

wherein the first priority threshold is a priority threshold related to the Uu interface, and the second priority threshold is a priority threshold related to the sidelink interface.

9. The terminal according to claim 8, wherein the processor is configured to:

determine that a priority of the logical channel of the Uu interface which triggering BSR is higher than a priority of the logical channel of the sidelink interface which triggering BSR, when the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the first priority threshold and the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the Uu interface which triggering BSR is not lower than the first priority threshold and the priority parameter of the logical channel of the sidelink interface which triggering BSR is not lower than the second priority threshold.

10. The terminal according to claim 8, wherein the processor is configured to:

determine that a priority of the logical channel of the sidelink interface which triggering BSR is higher than a priority of the logical channel of the Uu interface which triggering BSR, when the priority parameter of the logical channel of the sidelink interface which triggering BSR is lower than the second priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the second priority threshold and the priority parameter of the logical channel of the Uu interface which triggering BSR is lower than the first priority threshold; or determine that a priority of the logical channel of the sidelink interface which triggering BSR is higher than a priority of the logical channel of the Uu interface which triggering BSR, when the priority parameter of the logical channel of the sidelink interface which triggering BSR is not lower than the second priority threshold and the priority parameter of the logical channel of the Uu interface which triggering BSR is not lower than the first priority threshold.

11. The terminal according to claim 8, wherein the processor is configured to:

compare a priority parameter of a logical channel of the Uu interface which triggering BSR with a third priority threshold;

determine that a priority of the logical channel of the Uu interface which triggering BSR is higher than a priority of the logical channel of the sidelink interface which triggering BSR, when the priority parameter of the logical channel of the Uu interface which triggering BSR is lower than the third priority threshold; or determine that a priority of the logical channel of the sidelink interface which triggering BSR is higher than a priority of the logical channel of the Uu interface which triggering BSR, when the priority parameter of the logical channel of the Uu interface which triggering BSR is not lower than the third priority threshold.

12. The terminal according to claim 8, wherein the processor is configured to:

compare a priority parameter of a logical channel of the sidelink interface which triggering BSR with a fourth priority threshold;

determine that a priority of the logical channel of the sidelink interface which triggering BSR is higher than a priority of the logical channel of the Uu interface which triggering BSR, when the priority parameter of the logical channel of the sidelink interface which triggering BSR is lower than the fourth priority threshold; or determine that a priority of the logical channel of the Uu interface which triggering BSR is higher than a priority of the logical channel of the sidelink interface which triggering BSR, when the priority parameter of the logical channel of the sidelink interface which triggering BSR is not lower than the fourth priority threshold.

13. The terminal according to claim 8, wherein the processor is configured to:

send a BSR of the Uu interface preferentially, when the priority of the logical channel of the Uu interface which triggering BSR is higher than the priority of the logical channel of the sidelink interface which triggering BSR; or send a BSR of the sidelink interface preferentially, when the priority of the logical channel of the sidelink interface which triggering BSR is higher than the priority of the logical channel of the Uu interface which triggering BSR; or send a BSR of the Uu interface and a BSR of the sidelink interface randomly, when the priority of the logical channel of the Uu interface which triggering BSR is same as the priority of the logical channel of the sidelink interface which triggering BSR.

* * * * *